United States Patent

[11] 3,527,193

| [72] | Inventor | William R. Smith |
| | | Kalamazoo, Michigan |
| [21] | Appl. No. | 666,788 |
| [22] | Filed | Sept. 11, 1967 |
| [45] | Patented | Sept. 8, 1970 |
| [73] | Assignee | The Upjohn Company |
| | | Kalamazoo, Michigan |
| | | a corporation of Delaware |

[54] ANIMAL ACTUATED DRINKING VALVE WITH CHECK
5 Claims, 10 Drawing Figs.

[52] U.S. Cl. ................................................. 119/72.5
[51] Int. Cl. .................................................. A01k 7/00
[50] Field of Search ........................................ 119/72.5,
75; 137/329.1, 329.2, 329.3, 329.4, 614.02,
614.03, 614.04; 222/501, 497

[56] References Cited
UNITED STATES PATENTS

| 652,854 | 7/1900 | Marubio | 137/329.3 |
| 1,162,630 | 11/1915 | Mart | 137/329.3 |
| 3,215,119 | 11/1965 | Graham | 119/75 |
| 3,228,377 | 1/1966 | Grassano | 119/72.5 |
| 3,416,499 | 12/1968 | Wilmot | 119/72.5 |

*Primary Examiner*—Hugh R. Chamblee
*Attorneys*—Woodhams, Blanchard and Flynn, Eugene O. Retter and Talivaldis Cepuritis ABSTRACT: A valve assembly having first and second separable body parts with coaxial and communicating passageways therethrough and having a valve mechanism disposed within said passageways. The valve mechanism includes first and second annular and spaced checkvalve seats in the passageway of the first body part and checkvalve means therebetween adapted to engage and close one of said checkvalve seats at a time. Said valve mechanism also includes an annular valve seat in the passageway of the second body part and a valve means engageable with said valve seat for closing same. Means projecting from said valve means is engageable with said checkvalve means for obstructing its movement into a closed position in the checkvalve seat adjacent to said valve means when said first and second body parts are connected together.

Patented Sept. 8, 1970 3,527,193

INVENTOR.
WILLIAM R. SMITH
BY
Woodhams, Blanchard & Flynn
ATTORNEYS

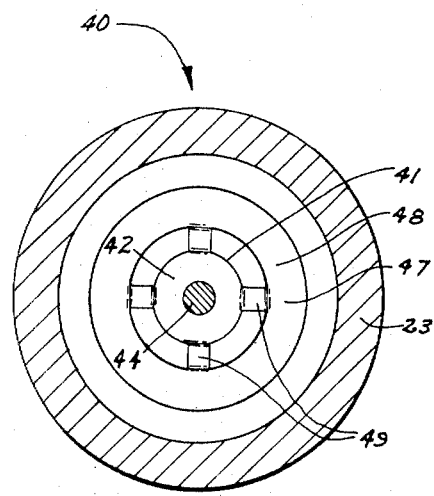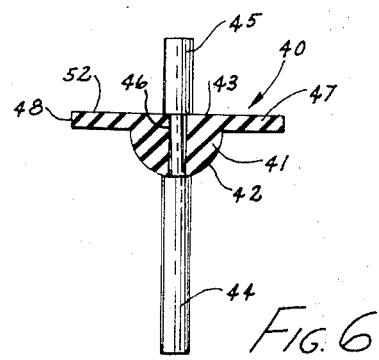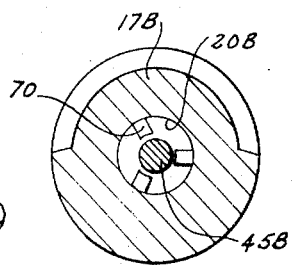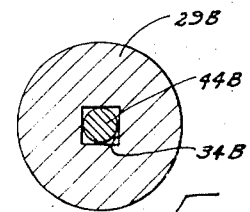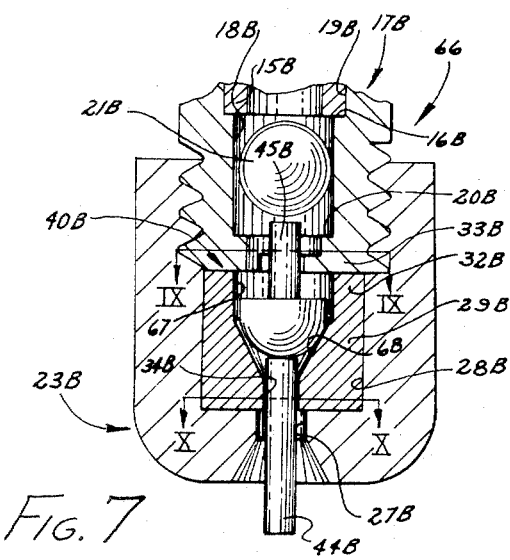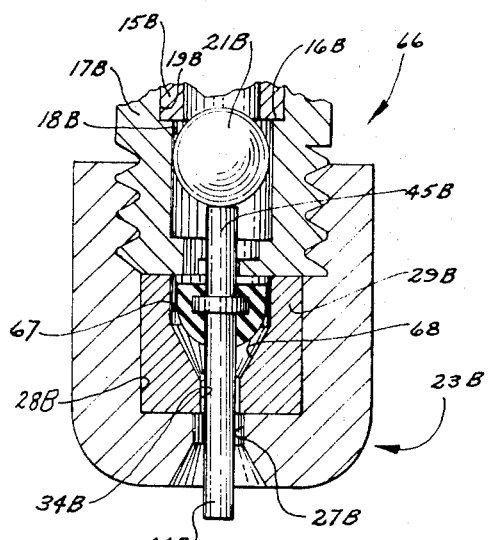

3,527,193

ANIMAL ACTUATED DRINKING VALVE WITH CHECK

BACKGROUND OF THE INVENTION

This invention relates in general to a valve assembly for controlling the flow of fluids and, more particularly, to a type of valve assembly in which the flow of liquids can be controlled by an animal, such as a small rodent, in response to the animal's demand for such liquid.

A number of animal-actuated valves have been developed for controlling the flow of liquids, such as water, therethrough in response to an operation of the valve by the animal, and such valves are particularly used in research laboratories, but may be used elsewhere. Two such valve assemblies are disclosed in U.S. Pat No. 3,008,451 entitled Animal Drinking Valve and in U.S. Pat No. 3,215,119 entitled Animal Drinking Fount. Generally speaking, the existing valves have either been relatively complicated, hence costly to manufacture and maintain, or they have lacked adequate means for preventing a backflow of the liquid being supplied therethrough, in the event of a failure in the pressure supplying the fluid, whereby the system to which the valve is connected becomes contaminated. Furthermore, where a plurality of animal-actuated valves are connected to the same system, the structure of many existing valves of this type could not be removed from the system without either closing another valve in series with the value to be removed or depressurizing the entire system.

Accordingly, a primary object of this invention has been the provision of an improved valve assembly capable of easy animal actuation, capable of use in a system having plural valve assemblies and capable of being at least partially disassembled for cleaning and/or repair without affecting the pressure of the liquid in the system to which the valve assembly is connected, and wherein the valve assembly will close automatically in the event of a pressure failure in the system to which the valve assembly is connected so that contamination of the system is positively prevented.

A further object of this invention has been the provision of a valve assembly, as aforesaid, including a valve head having integral, resilient means for holding the valve head in a closed position, and wherein the valve assembly is relatively simple in construction while achieving the foregoing purposes.

It is still another object to provide a valve which utilizes the flow of liquid therethrough to enhance its closing action.

Other objects and purposes of this invention will become apparent to persons familiar with this type of equipment upon reading the following descriptive material and examining the accompanying drawings, in which:

FIG. 5 is a sectional view taken along the line V—V in FIG. 2;

FIG. 6 is a central, cross-sectional view of part of the valve device;

FIG. 7 is a fragmentary, central, cross-sectional view of an alternate valve assembly embodying the invention;

FIG. 8 is a central, cross-sectional view similar to that appearing in FIG. 7 with the valve mechanism in a different position of operation;

FIG. 9 is a sectional view taken along the line IX—IX in FIG. 7; and

FIG. 10 is a sectional view taken along the line X—X in FIG. 7.

Figure 2:
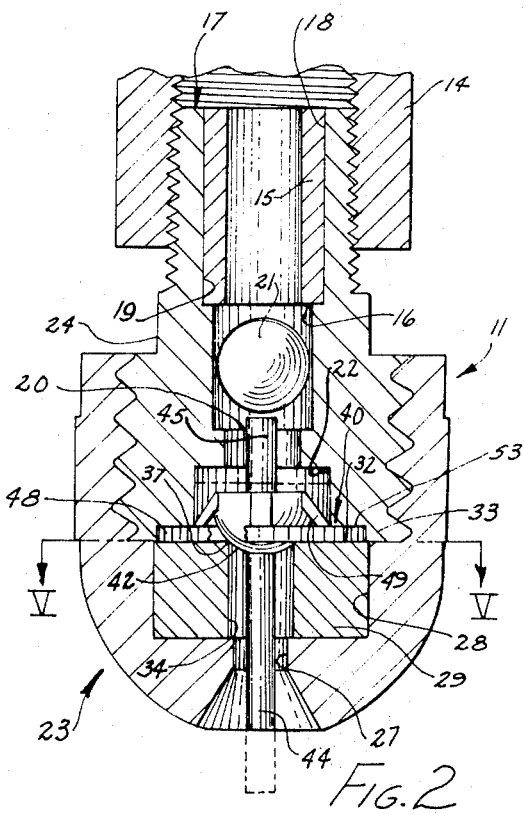
FIG. 2 is a sectional view taken along the line II—II in FIG. 1.
Figure 4:
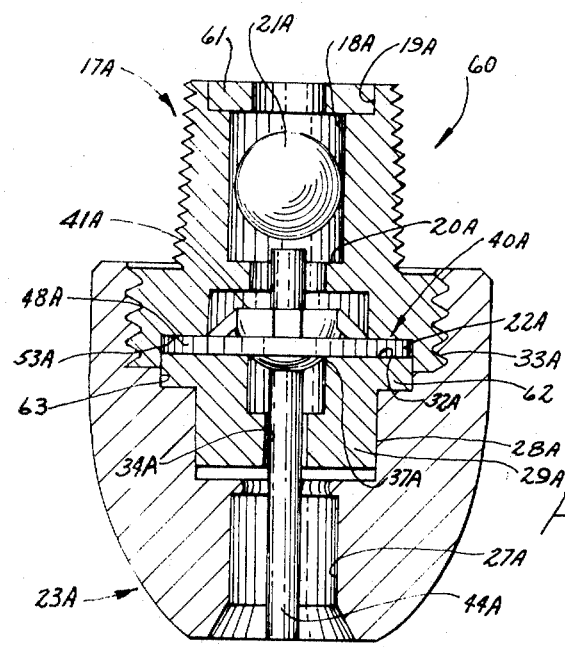
FIG. 4 is a sectional view similar to that of FIG. 2 and showing an alternate valve assembly.

For convenience in description, the terms "front", "rear" and words of similar import will have reference to the lower and upper ends, respectively, of the valve assembly embodying the invention as appearing in FIGS. 2, 4 and 7. The terms "inner", "outer" and derivatives thereof will have reference to the geometric center of said valve assemblies and parts thereof. However, these terms are not intended to limit the utility or scope of the invention.

SUMMARY OF THE INVENTION

The objects and purposes of the invention, including those set forth above, have been met by providing a valve assembly comprising first and second, substantially cylindrical body parts which are coaxially and removably connected to each other at adjacent ends thereof. In a preferred embodiment, this connection is effected by matching threads on the adjacent ends of the body parts, which parts have coaxial and communicating passageways enlarged at their adjacent ends. A pair of spaced and annular checkvalve seats are provided in the passageway of the first body part and a checkvalve is disposed between the seats for closing engagement with either seat, one at a time. An annular valve seat is disposed within the enlarged portion of the passageway in the second body part. A valve device, comprised of a valve head engageable with the valve seat and a valve stem extending through the valve seat, can be held in the closed position either by a resiliently flexible member integral with the valve head or by gravity. Said flexible member preferably has an annular outer edge which is clamped between the first body part and either the second body part or an insert therein whereby the valve head is yieldably held in a closed position while exerting a positive bias against said valve seat. A projection on the valve head extends through the adjacent of said pair of checkvalve seats and is engageable with the checkvalve to prevent closure of said adjacent checkvalve seat by the checkvalve when the two body parts are connected together.

DETAILED DESCRIPTION

Figure 1:
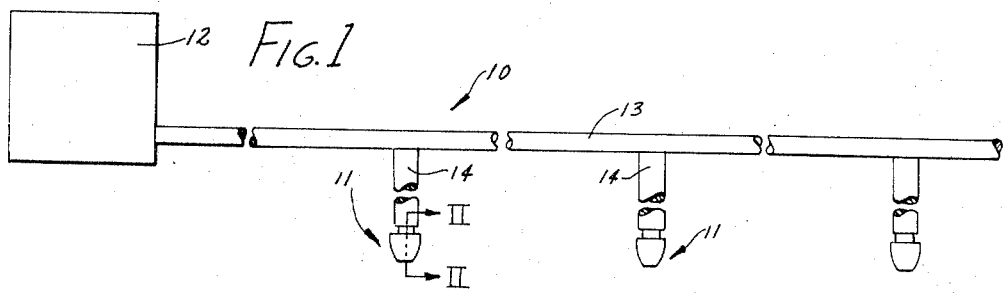
FIG. 1 is a broken, partially schematic view of a fluid supply system including valve assemblies embodying the invention.

The liquid supply system 10 (FIG. 1), with which the valve assembly 11 of the invention may be used, includes a source 12 of liquid, such as water, under pressure, a main supply line 13 and a plurality of branch lines or pipes 14 connected to the main line 13.

The valve assembly 11 (FIG. 2), which comprises one embodiment of the invention, has a first or rear body part 17 which is preferably substantially cylindrical and is externally threaded at its rearward end for threaded engagement with internal threads on the branch pipe 14. The rear body part 17 has a coaxial inlet passageway 18 with an enlarged rear end portion 19 and an enlarged front end portion 22. An inwardly extending annular ridge or checkvalve seat 20 is provided in the passageway 18 adjacent the rearward end of the enlarged front portion 22 for engagement by the spherical checkvalve 21. A cylindrical sleeve 15 is firmly disposed within the enlarged rear portion 19 of the passageway 18 so that its front end defines a checkvalve seat 16, also for engagement by the spherical checkvalve 21. The checkvalve seats 16 and 20 are spaced from each other sufficiently that they cannot be simultaneously closed by the checkvalve 21 and also so that checkvalve seat 16 cannot be closed as a result of movement of projection 45 to its normal uppermost position.

The front end of the rear body part 17 is externally threaded for threaded engagement with internal threads on the rearward end of the front body part 23. The peripheral surface 24 of the rear body part 17 between the front and rear threaded portions thereof may be knurled or provided with an out-of-round cross section to facilitate the gripping thereof when the body part 17 is connected to the branch pipe 14.

The front body part 23 has a coaxial outlet passageway 27 which has an enlarged portion 28 at its rearward end adjacent to and opening toward the enlarged portion 22 in the rear body part 17. An annular insert 29 is snugly disposed within the enlarged portion 28 so that its rear surface 32 will be close to the front end 33 of the rear body part 17 when it is connected to the front body part 23. Said annular insert 29 has a coaxial opening 34, the walls of which define a relatively sharp and annular valve seat 37 adjacent the rear surface 32. Alternatively, the valve seat 37 can be machined integral with front body part 23 in lieu of the insert 29.

The valve device 40 (FIGS. 5 and 6) is comprised of a valve head 41 preferably having a hemispherical surface 42 which is sealingly engageable with the valve seat 37 when the base 43 of said valve head 41 is substantially perpendicular to the central axis of the valve assembly 11. The valve seat 37 can be relatively sharp as shown in FIG. 2 or flat as shown in FIG. 7. Said valve device 40 has a valve stem 44 which preferably extends radially through and away from the central portion of the surface 42, as shown in FIG. 6. The valve stem 44 has an axially aligned rear extension 45 which projects through and beyond the base 43 in a direction substantially perpendicular thereto, and an annular recess 46 near its upper end into which the material forming the resilient valve head 41 is snugly received. The valve stem may be fabricated from any suitable material, such as metal or a relatively rigid plastic.

The valve device 40 includes a resiliently flexible and wheel-shaped member 47 having an outer ring 48 of rectangular or other cross-sectional contour and a plurality of radially disposed and resiliently flexible elements 49 which are preferably integral with and extend between the ring 48 and the valve head 41. In this embodiment, the valve head 41, the elements 49 and the ring 48 are formed, as by molding, in a single unit from an elastomeric material, such as rubber, either natural or synthetic, silicone rubber, or other suitable material. In the unstressed condition of FIG. 6, the rearward surface 52 of the ring 48 is preferably substantially coplanar with the base 43 of the valve head 41, but other specific arrangements are contemplated.

The ring 48 (FIG. 2) is of such size and shape that it can be firmly clamped between the rear surface 32 of the annular insert 29 or the like, and the front end 33 of the rear body part 17. A slight annular recess 53 may be provided in the front end 33 of the rear body part 17 for snugly receiving and accurately locating the outer ring 48, hence the valve device 40 when the two body parts are assembled.

Figure 3:
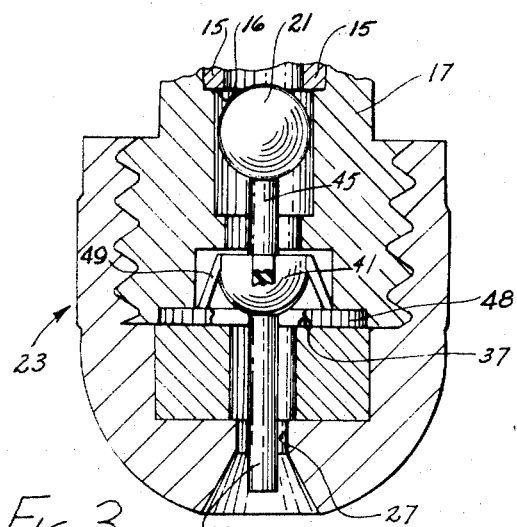
FIG. 3 is a fragmentary view of FIG. 2 showing the valve mechanism in a different position of operation.

The ring 48 serves not only to position or center the valve head 41 properly against the valve seat 37, but also to prevent leakage of fluid from the inlet passageway 18 between the front end 33 of the rear body part and the insert 29. Accordingly, fluid entering the inlet passageway 18 can enter the outlet passageway 27 only through the opening 34 in the annular insert 29 when the valve head 41 is spaced from the valve seat 37, as shown in FIG. 3.

The valve head 41 is held against the valve seat 37 by the resiliently flexible elements 49 which, as shown in FIG. 2, are under tension when the ring 48 is clamped between the front and rear body parts. As shown in FIG. 2, a substantial portion of the valve 41 is disposed within the enlarged front portion 22 of the inlet passageway 18 when the valve head is seated. Additional axial space is provided within said enlarged front portion 22 for reception of the valve head 41 when it is unseated, as shown in FIG. 3. The cross-sectional area of the valve stem 44 is substantially smaller than the cross-sectional areas of the opening 34 in the insert 29 and of the outlet passageway 27 so that liquid can flow through the outlet passageway 27 when the valve head 41 is held away from the valve seat 37.

The length of the rear extension 45 of the stem 44 is such that said extension positively prevents closing engagement of the checkvalve 21 by the checkvalve 21 when the front and rear body parts are properly assembled together. In this embodiment, the rear extension 45 is of such length that maximum rearward movement of the valve device 40 cannot cause the rear extension 45 to press the checkvalve 21 against the seat 16 before the base 43 engages the front side of the annular ridge 20.

ALTERNATE CONSTRUCTION

The valve assembly 60 (FIG. 4) is in general similar to the valve assembly 11 and, accordingly, corresponding parts of the assembly 60 will carry the same numerical designations as their counterparts in the assembly 11 with the suffix "A". The assembly 60 comprises a rear body part 17A which is externally threaded at its rearward end for reception into a branch pipe 14, and the front end of the rear body part is externally threaded for engagement with the internal threads at the rearward end of the front body part 23A. The rear body part has an inlet passageway 18A with enlarged rear and front end portions 19A and 22A, respectively.

An annular checkvalve seat 61 of relatively short axial extent is snugly received in the enlarged rear portion 19A of the inlet passageway 18A whereby the valve assembly 60 can be considerably shorter axially than the valve assembly 11. The annular and integral checkvalve seat 20A is also engageable by the spherical checkvalve element 21A.

The front body part 23A has a coaxial outlet passageway 27A with an enlarged rearward portion 28A in which an annular insert 29A is disposed. However, the insert 29A has an external, annular flange 62 which is snugly disposed within an annular recess 63 adjacent the rearward end of the enlarged portion 28A. The flange 62 is of such axial extent that, when it is snugly disposed within the annular recess 63, it will also project axially into the annular recess 53A in the front end 33A of the rear body part 17A. Thus, the ring 48A on the valve device 40A can be firmly clamped between the rear surface 32A of the insert 29A and the front end 33A of the rear body part 17A.

The insert 29A, like the insert 29, can be made from a plastic material, for example, which provides an excellent seal but might not be the most suitable material for the exposed surfaces of the front body part 23A. Also, the insert 29A can be integral with said front body part 23A.

The valve device 40A may be, and preferably is, identical with the valve device 40, subject to minor variations, as in the length of the valve stem, which may be varied as desired and as indicated by broken lines in FIG. 2. The stem 44A is of sufficiently smaller cross-sectional area than the opening 34A and the outlet passageway 27A to permit the flow of liquid therethrough when the valve head 41A is spaced from the valve seat 37A.

The valve assembly 66 (FIGS. 7 and 8) includes a number of parts which correspond to parts in the valve assembly 11 and, therefore, will carry the same numerical designations as their counterparts in the assembly 11 with the suffix "B". The valve assembly 66 comprises a rear body part 17B which is externally threaded at its front end for engagement with the internal threads at the rearward end of the front body part 23B. The rear body part 17B has an inlet passageway 18B with an enlarged rear portion 19B and an inwardly projecting, annular checkvalve seat 20B at its front end. A sleeve 15B is disposed within the enlarged rear portion 19B and the front end thereof provides a checkvalve seat 16B. A spherical checkvalve 21B is disposed in the passageway 18B between the checkvalve seats 16B and 20B.

The front body part 23B has an outlet passageway 27B with an enlarged rear portion 28B in which an annular insert 29B is snugly disposed. The rear surface 32B of the insert 29B is firmly and sealingly engaged by the front end 33B of the rear body part 17B.

The insert 29B has a central opening 34B with an enlarged rearward portion 67 and a frontwardly converging central portion which provides a valve seat 68, which can be conical or relatively sharp as shown in FIG. 2. The valve device 40B includes a valve stem 44B having an integral flange 69 and a valve head 41B molded around the stem 44B in the region of the flange 69. The rear extension 45B of the stem 44B projects rearwardly through the checkvalve seat 20B when the body parts 17B and 23B are properly connected together, whereby the checkvalve 21B is prevented from closing against the checkvalve seat 20B.

A plurality of guide elements 70 (FIG. 9) are integral with, and project inwardly and uniformly from, the lower part of the annular checkvalve seat 20B to slideably engage the extension 45B and thereby guide the valve head 41B (FIG. 7) into proper sealing engagement with the valve seat 68. The opening 34B (FIG. 10) in the insert 29B may be out of round, such as square, so that its wall slideably and guidingly engages the stem 44B but still provides open space through which the liquid can flow when the valve head 41B is unseated.

The valve assembly 66 is specifically designed for operation wherein the valve stem 44B is at least substantially vertical so that gravity aids in the seating of the valve head 41B against the valve seat 68.

OPERATION

The operation of the valve assembly 11 and/or the valve assembly 60 is apparent to the skilled artisan from the foregoing description thereof so that the following is primarily a summary of such operation. A liquid, such as water, is supplied from a source 12 (FIG. 1) under suitable pressure into the main supply line 13 and thence through the branch pipes 14 within the inlet passageway 18 adjacent the valve head 41. This pressure cooperates with the resilient flexibility of the elements 49 in the valve device 40 to urge the valve head 41 snugly against the valve seat 37 and thereby positively prevent the flow of the liquid into and through the opening 34 in the insert 29. When water is flowing through the insert 29, the spherical checkvalve 21 further enhances the closing action of the valve device 40 by resting against the uppermost end of projection 45 and exerting a closing force on the valve device. The ring 48 on said valve device 40 serves as a liquid-tight gasket to prevent the escape of liquid between the rear body part 17 and the adjacent rear surface 32 of the annular insert 29.

The valve stem 44 preferably extends to the frontward end of the front body part 23 so that it can be engaged by an animal, such as a rodent, when it wishes to obtain some of the liquid. Generally speaking, a small amount of movement of the valve stem 44, particularly in a rearward and axial direction, will unseat the valve head 41 so that said liquid can move past the valve and thence through the opening 34 into the outlet passageway 27 where it is ingested by the animal. As soon as the animal's needs for the liquid have been satisfied and, therefore, he ceases to move the stem 44, the valve head 41 immediately reseats itself within the valve seat 37 due to the tension on the elements 49 and aided by the checkvalve 21. This closing movement is enhanced by the pressure differential in passageway 18 between the uppermost and lowermost portions of checkvalve 21 as the liquid flows past, thereby urging the checkvalve 21 against the projection 45.

Due to the resilient flexibility of the elements 49, the valve head 41 will be held firmly and sealingly against the valve seat 37 even when there is a failure in the pressure urging the liquid against the valve head 41. Thus, there is little possibility of a backflow of any of the liquid which may be present and possibly contaminated within the outlet passageway 27. In this regard, it is noted that valve assemblies of the type described herein are frequently used to supply liquids to small animals which are being used in conducting tests, including the therapeutic effects of certain medicines. Thus, it is highly desirable, if not essential, to isolate the animals from each other, which requires the positive prevention of a feedback into the system which is being used to supply the same liquids to other animals. However, even if the pressure drop at the source 12 or in the line 13 is such that it will unseat the valve head 41 from its valve seat 37, or where an actual negative pressure is developed within the passageway 18 rearwardly of the checkvalve 21, contamination of the system is avoided by the checkvalve 21 which will be immediately drawn against the checkvalve seat 16 and thereby positively prevent any flow of liquid rearwardly of this point. Thus, the valve assembly 11 has two means of preventing liquid backflow and the resultant contamination of the system.

If a valve device 40 needs replacing or cleaning, disassembly of the valve assembly 11 can be quickly and easily effected merely by disconnecting the front body part 23 from the rear body part 17, after which the insert 29 and valve device 40 can be quickly and easily removed from the front body part 23. Because of the checkvalve seat 20 and checkvalve 21, it is unnecessary to depressurize the entire fluid system 10 when this cleaning is performed because said checkvalve will effectively block the flow of liquid out of the front end of the rear body part 17.

It has been found that the spherical checkvalve 21, which can be fabricated from a relatively lightweight but rigid plastic material such as nylon, for example, serves the further purpose of moderating the flow of liquid through the passageway 18 when the valve head 41 is suddenly unseated and thereby improving the operation of the valve assembly in discharging the liquid to the animal. The pressure of the liquid against the ball is transferred against the rear extension 45 of the stem 44 to provide a more positive closing of the valve head 41 after actuation of the valve device by the animal.

The operation of the valve assembly 60 is identical with that discussed above with respect to the valve assembly 11.

The operation of the valve assembly 66 differs from the operation of the valve assembly 11, for example, in that the positive seating of the valve head 41B against the valve seat 68 is effected by gravity rather than by positive means, such as the resilient elements 49. However, in all other respects the operation of the valve assembly 66 is identical with the operation of the valve assembly 11. That is, the spherical checkvalve 21B positively prevents the backflow of liquid if a pressure drop develops between the outlet and inlet passageways 27B and 18B, respectively. The checkvalve 21B also permits disconnection of the forward body part 23B from the rear body part 17B without the need of depressurizing the entire system.

Although particular preferred embodiments of the invention have been disclosed above for illustrative purposes, it will be understood that variations or modifications of such disclosure, which lie within the scope of the appended claims, are fully contemplated.

I claim:

1. In an animal-actuated valve assembly having a first body part with an inlet passageway and a second body part with an outlet passageway communicating with said inlet passageway, and means for connecting said body parts together, a valving device comprising:

means defining first and second, annular and coaxial checkvalve seats spaced from each other in said inlet passageway;

checkvalve means within said inlet passageway between said seats and engageable therewith, one at a time, for closing the openings therethrough;

means defining an annular valve seat concentrically in said outlet passageway;

a valve head having a curved surface situated intermediate said valve seat and one of said checkvalve seats and adapted to close the opening through said valve seat positively in a direction away from said first body part;

a valve stem secured to and extending away from said surface along substantially the entire length of said outlet passageway and being adapted for actuation by an animal, at least part of said stem being spaced from the wall defining said passageway; and means projecting from said valve head and extending through the adjacent one of said first and second checkvalve seats for engagement with said checkvalve means so as to block the seating of said checkvalve means with one of said checkvalve seats when said first and second body parts are connected together.

2. A valve assembly according to claim 1, wherein said checkvalve means is a free sphere and the surface on said valve head is hemispherical.

3. In an animal-actuated valve assembly having a first body part with an inlet passageway and a second body part with an outlet passageway communicating with said inlet passageway, and means for connecting said body parts together, a valving device comprising:
  means defining first and second, annular and coaxial checkvalve seats spaced from each other in said inlet passageway;
  checkvalve means within said inlet passageway between said seats and engageable therewith, one at a time, for closing the openings therethrough;
  means defining an annular valve seat concentrically in said outlet passageway;
  a valve head having a curved surface situated intermediate said valve seat and one of said checkvalve seats and adapted to close the opening through said valve seat positively in a direction away from said first body part;
  a valve stem secured to and extending away from said surface and along said outlet passageway, at least part of said stem being spaced from the wall defining said passageway;
  resiliently flexible means secured to said valve head and radially extending therefrom transaxially of said valve stem, said flexible means being clamped near its outer edge between the adjacent end portions of said first and second body parts, whereby said valve head is yieldably held against said valve seat; and
  means projecting from said valve head and extending through the adjacent one of said first and second checkvalve seats for engagement with said checkvalve means so as to block the seating of said checkvalve means with one of said checkvalve seats when said first and second body parts are connected together.

4. A valve assembly according to claim 3, wherein said checkvalve means is spherical;
  wherein said resiliently flexible means includes a ring and a plurality of radially disposed elements integral with and extending between said ring and said valve head; and
  a relatively sharp annular valve seat is situated adjacent to and adapted to engage said valve head.

5. a valve assembly according to claim 3, wherein said checkvalve means is a free sphere situated within said inlet passageway;
  wherein said valve head is substantially hemispherical; and
  a substantially conical valve seat is situated adjacent to and is adapted for engagement by said valve head.